United States Patent
Atkinson

(12) 
(10) Patent No.: US 6,332,358 B1
(45) Date of Patent: Dec. 25, 2001

(54) FLUID-GAUGING SYSTEM AND METHODS

(75) Inventor: Harry Atkinson, Wokingham (GB)

(73) Assignee: Smiths Group PLC, London (GB)

( * ) Notice: Subject to any disclaimer, the term of this patent is extended or adjusted under 35 U.S.C. 154(b) by 0 days.

(21) Appl. No.: 09/603,199

(22) Filed: Jun. 26, 2000

(30) Foreign Application Priority Data

Jul. 1, 1999 (GB) .................................................. 9915254

(51) Int. Cl.[7] ............................ G01F 23/00; G08B 29/00
(52) U.S. Cl. ........................ 73/304 R; 73/290 R; 340/514
(58) Field of Search .......................... 73/290 R, 304 R, 73/1.73

(56) References Cited

U.S. PATENT DOCUMENTS

| | | | |
|---|---|---|---|
| 4,182,363 | * | 1/1980 | Fuller ................................... 137/392 |
| 4,224,606 | * | 9/1980 | Bartles ................................. 340/514 |
| 4,382,382 | * | 5/1983 | Wang ................................... 73/304 R |
| 4,908,783 | * | 3/1990 | Maier ................................... 364/560 |

FOREIGN PATENT DOCUMENTS

| 0 289 303 | 4/1988 | (EP) . |
|---|---|---|
| 0 303 874 | 7/1988 | (EP) . |

* cited by examiner

*Primary Examiner*—Hezron Williams
*Assistant Examiner*—Katina Wilson
(74) *Attorney, Agent, or Firm*—Connolly Bove Lodge & Hutz LLP.

(57) ABSTRACT

An aircraft ultrasonic fuel-gauging system has a number of gauging probes in a tank arranged so as to include at least one set of three colinear probes. The outputs of the probes are supplied to a unit, which checks the operation of the probes in colinear sets by extrapolating height at one of the probes from the outputs of the other probes. Where there are two sets of colinear probes having a common probe it is possible uniquely to identify if the common probe is faulty. The system rejects any faulty probe and uses only the outputs of other probes in computations of fuel quantity.

12 Claims, 2 Drawing Sheets

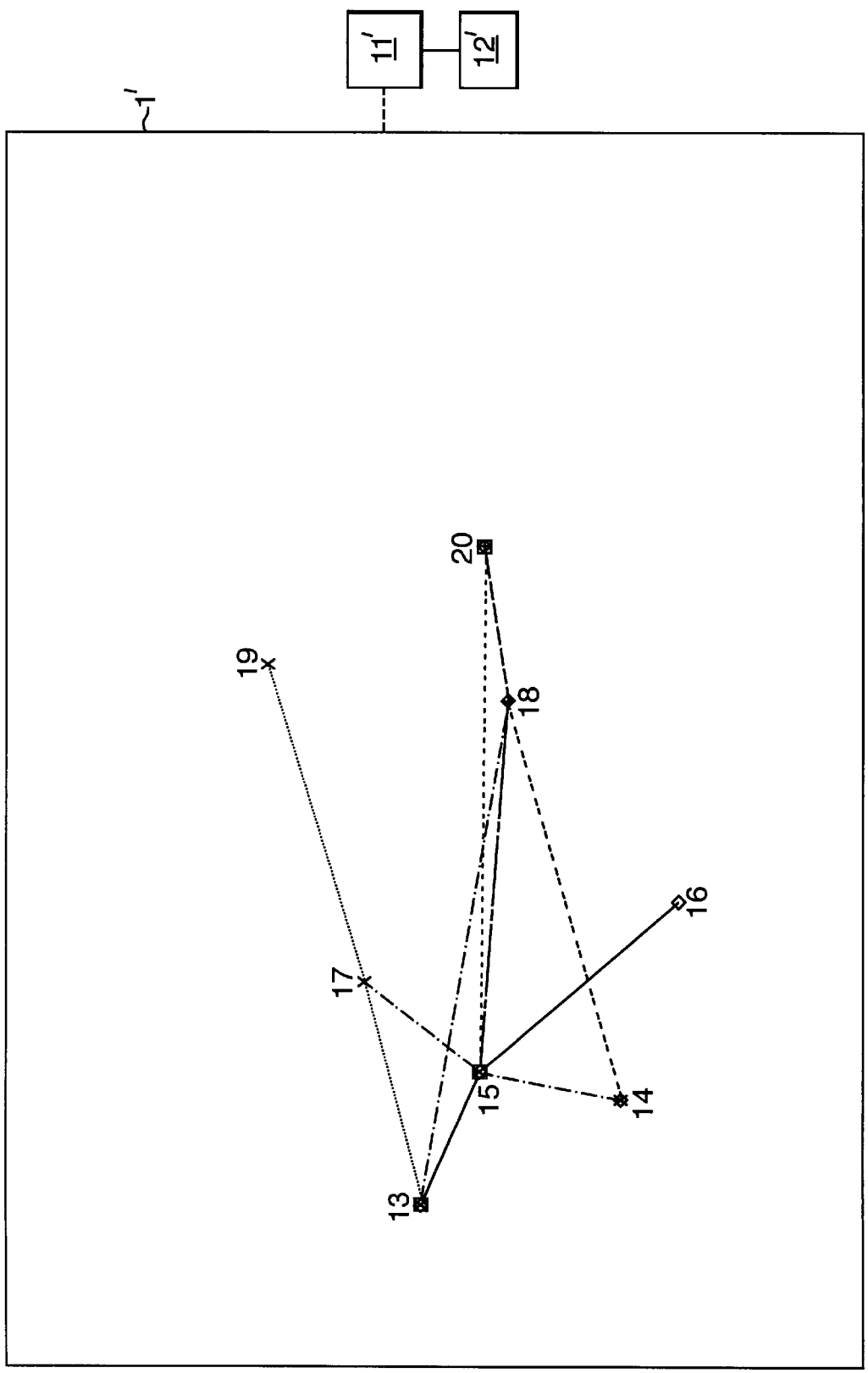

FLUID-GAUGING SYSTEM AND METHODS

BACKGROUND OF THE INVENTION

This invention relates to fluid-gauging systems and methods.

Aircraft fuel tanks usually have several probes disposed to measure the height of fuel within the tank at different locations. The probes may be of any conventional kind, such as capacitive or ultrasonic probes. The probes are preferably located in a non-linear fashion, that is so that the locations of no three probes lie on a straight line. In this way, the maximum information can be obtained about the orientation of the surface plane of the fuel. In practice, however, it is not usually possible to locate all probes within a tank so that no three are arranged in a straight line or an almost straight line because of limited availability of fixing points, intrusions into the tank and other factors. The construction of fuel-gauging probes can make them prone to false readings if, for example, there is a blockage of fuel flow into or out of the probe, an accumulation of foam within the probe, adverse thermal stratification conditions, water contamination, damage to the probe or the like. Because of the movement of the fuel surface within the tank, it is not always immediately apparent when a probe is providing a false height reading.

BRIEF SUMMARY OF THE INVENTION

It is an object of the present invention to provide an alternative fluid-gauging system and method.

According to one aspect of the present invention there is provided a fluid-gauging system including a set of at least three substantially colinear probes arranged to provide respective outputs indicative of the height of fluid at three different locations, the system being arranged to extrapolate the height of fluid at a first of the locations from the outputs of probes at the other two locations, and the system being arranged to compare the extrapolated height with the output of the probe at the first location to determine if the probes are performing correctly.

The system preferably includes at least two sets of substantially colinear probes, the two sets having a common probe such that a fault in the common probe can be identified uniquely. The system preferably includes at least one non-colinear set of probes. The system is preferably arranged to provide an output of fluid quantity derived only from those probes identified as functioning incorrectly. The probes may be acoustic gauging probes. The system may be an aircraft fuel-gauging system, the probes being located in an aircraft fuel tank.

According to another aspect of the present invention there is provided a method of fluid-gauging including the steps of receiving outputs from a set of at least three substantially colinear probes, extrapolating the height of fluid at one of the probes from outputs of the other probes, comparing the extrapolated output of the one probe with its actual output to determine whether the probes in the set are functioning correctly.

Outputs may be received from at least two sets of substantially colinear probes having a common probe, the method including the step of identifying a fault in the common probe if a fault is identified in both sets. The method preferably includes the step of providing an output indicative of fluid quantity from only those probes not identified as functioning incorrectly.

An aircraft fuel-gauging system and method according to the present invention, will now be described, by way of example, with reference to the accompanying drawings.

BRIEF DESCRIPTION OF THE DRAWINGS

FIG. 3 is a plan view of a tank having eight probes.

DETAILED DESCRIPTION OF THE PREFERRED EMBODIMENTS

Figure 1:
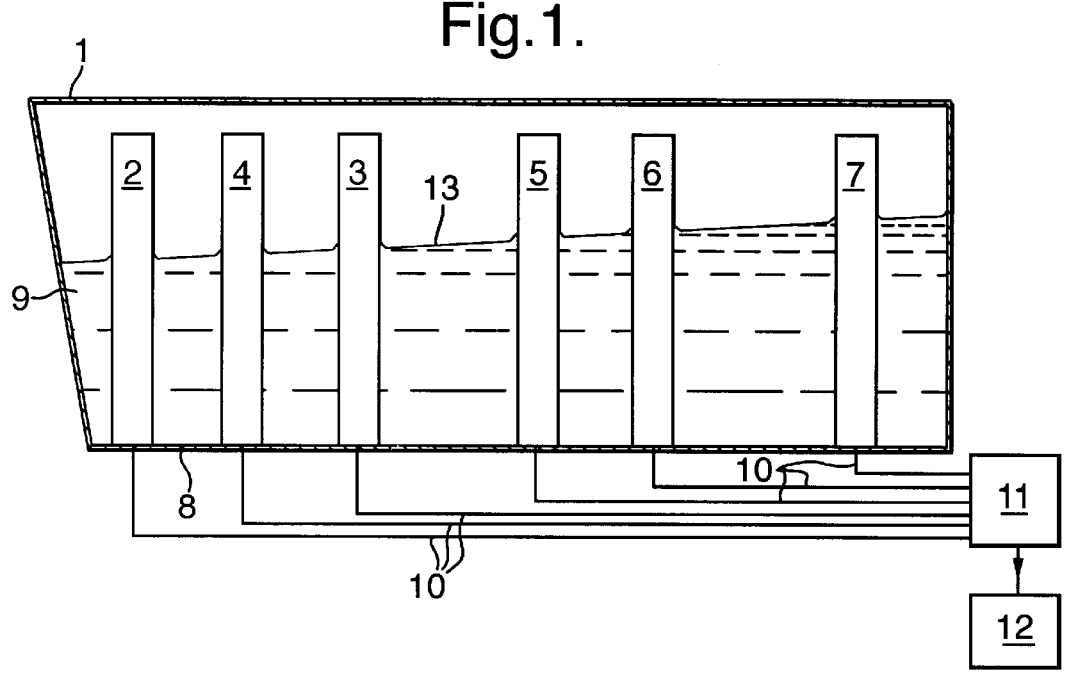
FIG. 1 is a schematic side elevation view of a system having six probes.
Figure 2:
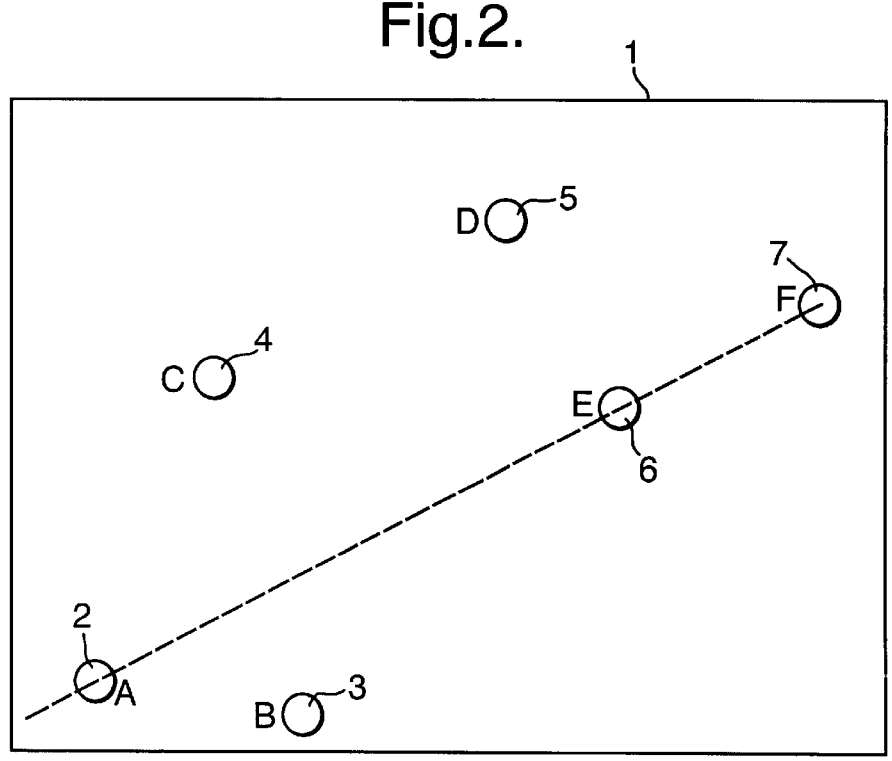
FIG. 2 is a plan view of the tank and probes of the system shown in FIG. 1.

With reference first to FIGS. 1 and 2 there is shown a system including a fuel tank 1 having six conventional ultrasonic, acoustic fuel-gauging probes 2 to 7 mounted substantially vertically on or above the floor 8 of the tank to project upwardly within fuel 9 in the tank. The probes 2 to 7 are mounted at different locations designated A to F in FIG. 2. Cables 10 connect the probes 2 to 7 with a fuel-gauging unit 11, which supplies signals to the probes in the usual way and receives their outputs. The fuel-gauging unit 11 computes the mass of fuel and provides an output to a display or other utilization means 12.

As can be seen from FIG. 2, three of the probes 2, 6 and 7 are located in a colinear set at locations A, E and F which form a straight line in the plane of the surface of the fuel. All other sets of three probes are located in non-colinear sets, such as, for example, probes 2, 3 and 4, which are at locations A, B and C, or probes 5, 6 and 7, which are at locations D, E and F. Any one of these non-colinear sets of three probes can be used to identify three points on the plane of the surface 13 of the fuel 9, which is sufficient to identify the position and orientation of the fuel surface uniquely.

The fuel-gauging unit 11 performs the following processing steps on the outputs of the probes:

1. Determine height of fuel at each probe using conventional processing;
2. Check whether any of the probes is inactive, that is, fully exposed (dry) or fully submerged;
3. Identify the probes in a colinear set, namely probes 2, 6 and 7;
4. If all probes within a colinear set are not inactive, extrapolate by trigonometry the expected output of one of the probes in the colinear set from the outputs of the other two probes in that set;
5. If all probes within a colinear set are not inactive, compare the extrapolated, expected output of the probes derived in step 4 with the actual output from the probes to check whether they are within accepted tolerances;
6. If step 5 indicates a discrepancy, signal that there is a possible fault in the colinear set;
7. Respond to any such signal produced at step 6 to exclude outputs from the three probes 2, 6 and 7 from calculation of the fuel plane position and orientation, and instead use outputs from a non-colinear set of probes that does not include the probes 2, 6 and 7, namely the non colinear set of probes 3, 4 and 5;
8. Compute the volume of fuel in a conventional manner from knowledge of position of the fuel surface and tank shape; and
9. Compute the mass of fuel from the volume and from density information, such as from a densitometer.

It will be appreciated that, where the colinear set of probes only comprises three probes, as above, it is not possible to identify which probe of the three provides a false reading, since a disagreement between an extrapolated height and a probe output could mean either that the output of the extrapolated probe is faulty or that the output of one of the other probes used in the extrapolation is faulty. If, however, four or more probes are arranged in a colinear fashion, it would be possible to identify one faulty probe of the set. It is also possible to identify uniquely a faulty probe in a colinear set of three probes if that probe is also a member of other colinear sets, since a fault indication in those sets would be indicative that the fault occurs in the common probe of the sets.

The probes need not be exactly aligned on a straight line to form a colinear set, although the tolerances referred to in Step 5 above would be increased. FIG. 3 shows a system with a tank 1' having eight probes 13 to 20 in which there are eight colinear sets, as follows: 13, 15 and 16; 13, 15 and 18; 13, 15 and 20; 13, 17 and 19; 13, 18 and 20; 14, 15 and 17; 14, 18 and 20; and 15, 18 and 20. In this system there are only two probes 16 and 19 that are members of only one colinear set. It is still, however, possible to identify uniquely when those probes are faulty because the other probes in the respective sets, that is, probes 13 and 17, and 13 and 15, can be excluded by checking the other colinear sets of which they are members. It will be appreciated that there are multiple non-colinear sets of probes within this eight-probe system. If, for example, the check on the colinear sets of probes 13, 17 and 19 and the set 14, 15 and 17 both indicate a fault, the fuel-gauging unit 11' determines that probe 17, which is common to both sets, is faulty. The fuel-gauging unit 11' then uses only those non-colinear sets of probes that do not include probe 17 in its calculation of fuel quantity. For example, the non-colinear set 13, 15 and 14, or 19, 18 and 20 could be used.

The invention enables incorrectly operating probes to be identified so that the fluid gauging can be performed with only those probes that are functioning correctly, thereby enhancing the accuracy of the system.

It will be appreciated that the invention is not confined to gauging in aircraft or to gauging of fuel but could be used in any fluid-gauging system having at least three probes. In systems where there are only three probes, it is not possible to identify the faulty probe but it is possible to identify that there is a fault and provide a warning.

What I claim is:

1. A fluid-gauging system comprising: a set of at least three substantially colinear probes arranged to provide respective outputs indicative of the height of fluid at three different locations; and a unit connected to receive the outputs of said probes, said unit being arranged to extrapolate the height of fluid at a first of said locations from the outputs of probes at the other two locations, and wherein said unit is arranged to compare the extrapolated height with the output of the probe at the first location to determine if said probes are performing correctly.

2. A system according to claim 1 including at least two sets of substantially colinear probes.

3. A system according to claim 2, wherein said two sets have a common probe such that said unit can uniquely identify a fault in the common probe.

4. A system according to claim 1 including at least one non-colinear set of probes.

5. A system according to claim 1, wherein said unit is arranged to provide an output of fluid quantity derived only from those probes not identified as functioning incorrectly.

6. A system according to claim 1, wherein said probes are acoustic gauging probes.

7. A fluid-gauging system comprising: a number of probes arranged to provide respective outputs indicative of the height of fluid at different locations, said probes being arranged to include a first set of three substantially colinear probes and a second set of three non-colinear probes; and a unit connected to receive the outputs of said probes, said unit being arranged to extrapolate the height of fluid at a first of said locations corresponding to one of said probes in said colinear set from the outputs of other probes of said colinear set, wherein said unit is arranged to compare the extrapolated height with the output of the probe at the first location to determine if said probes are performing, correctly, and wherein said unit is arranged to compute fluid quantity excluding outputs from probes identified as not performing correctly.

8. An aircraft fuel-gauging system comprising: a set of at least three substantially colinear acoustic probes arranged to provide respective outputs indicative of the height of fuel at three different locations in a fuel tank; and a unit connected to receive the outputs of said probes, said unit being arranged to extrapolate the height of fuel at a first of said locations from the outputs of probes at the other two locations, and wherein said unit is arranged to compare the extrapolated height with the output of the probe at the first location to determine if said probes are performing correctly.

9. A method of fluid-gauging, comprising the steps of: receiving outputs from a set of at least three substantially colinear probes; extrapolating the height of fluid at one of the probes from outputs of the other probes; comparing the extrapolated output of the one probe with its actual output; and determining whether the probes in the set are functioning correctly.

10. A method according to claim 9, wherein outputs are received from at least two sets of substantially colinear probes having a common probe, and including the step of identifying a fault in the common probe if a fault is identified in both sets.

11. A method according to claim 9 including the step of providing an output of fluid quantity from outputs of only those probes not identified as functioning incorrectly.

12. A method of fluid-gauging comprising the steps of: receiving outputs from a plurality of fluid-gauging probes; identifying those outputs from a set of probes arranged substantially colinearly of one another; extrapolating the height of fluid at one of the probes of said set from Outputs of other probes of said set; comparing the extrapolated output of said one probe with its actual output to determine whether all probes in said set are functioning correctly; and providing an output indicative of fluid quantity derived only from those probes functioning correctly.

* * * * *